(12) United States Patent
Flake (10) Patent No.: US 9,831,972 B2
(45) Date of Patent: Nov. 28, 2017

(54) SYNCHRONIZATION OF CLOCKS AND SENSORS VIA EXPONENTIAL-BASED TDR AND COMMUNICATION OF EXPONENTIAL-NULL PULSE SEQUENCES

(71) Applicant: Board of Regents of the University of Texas System, Austin, TX (US)

(72) Inventor: Robert H. Flake, Austin, TX (US)

(73) Assignee: Board of Regents, The University of Texas System, Austin, TX (US)

( * ) Notice: Subject to any disclaimer, the term of this patent is extended or adjusted under 35 U.S.C. 154(b) by 0 days.

(21) Appl. No.: 15/388,007

(22) Filed: Dec. 22, 2016

(65) Prior Publication Data

US 2017/0187480 A1    Jun. 29, 2017

Related U.S. Application Data

(60) Provisional application No. 62/387,341, filed on Dec. 23, 2015.

(51) Int. Cl.
| | | |
|---|---|---|
| *H04L 27/00* | (2006.01) | |
| *H04J 3/06* | (2006.01) | |
| *H04B 1/02* | (2006.01) | |
| *H04B 10/524* | (2013.01) | |
| *H04B 3/02* | (2006.01) | |
| *H04L 25/03* | (2006.01) | |
| *H04B 1/06* | (2006.01) | |
| *H04L 27/06* | (2006.01) | |

(52) U.S. Cl.
CPC .............. *H04J 3/0644* (2013.01); *H04B 1/02* (2013.01); *H04B 1/06* (2013.01); *H04B 3/02* (2013.01); *H04B 10/524* (2013.01); *H04L 25/03834* (2013.01); *H04L 27/06* (2013.01)

(58) Field of Classification Search
CPC .......... H04B 10/524; H04B 1/02; H04B 1/06; H04B 3/02; H04L 25/03834; H04L 27/06
USPC ....................................................... 375/295
See application file for complete search history.

*Primary Examiner* — Kyung H Shin
(74) *Attorney, Agent, or Firm* — Meyertons Hood Kivlin Kowert & Goetzel, P.C.; Jeffrey C. Hood; Mark K. Brightwell (57) ABSTRACT

A method for establishing synchronization between a master clock and a slave clock. A transmitter near the master clock transmits a pulse sequence onto an electrical cable that extends between the transmitter and a receiver near the slave clock. Each pulse of the pulse sequence is either a null pulse (i.e., a zero pulse) or a pulse of exponential kind, depending a corresponding bit in a bit sequence. Each pulse of exponential kind has a leading edge pf exponential shape corresponding to the exponential coefficient α. The bit sequence represents the sum of (a) a current timestamp of the master clock and (b) an adjustment value that represents the one-way time of-flight of the exponentially shaped leading edge through the cable. The receiver recovers the bit sequence from the pulse sequence, and loads the bit sequence into the slave clock, to establish synchronization.

40 Claims, 7 Drawing Sheets

1000 perform operations using first circuitry situated at the first location, wherein the operations include transmitting a sequence of pulses onto an electrical cable at a first end of the electrical cable, wherein the electrical cable extends between the first location and the second location, wherein each of the pulses of said sequence is either a zero pulse or a pulse of exponential kind, depending on a respective bit in a binary representation of a given time value, wherein the given time value depends at least on: (a) a current time value of the master clock; and (b) a one-way time of flight through the electrical cable, wherein each pulse of exponential kind in the sequence of pulses has a leading edge that is exponentially shaped with the exponential coefficient value $\alpha$. *1010*

2000 perform operations using circuitry situated at the second location, wherein the
operations include:     2010

> receiving a sequence of pulses from an end of the electrical cable, wherein the electrical cable extends between the first location and the second location, wherein each of the pulses of said sequence is either a zero pulse or a pulse of exponential kind, wherein each pulse of exponential kind in the sequence of pulses has a leading edge that is exponentially shaped with the exponential coefficient value α.     2015

> converting the received sequence of pulses into a corresponding sequence of bits in order to recover a first time value, wherein each of the pulses of said sequence of pulses is used to determine a corresponding one of the bits of said sequence of bits     2020

> loading the first time value (or a value derived from the first time value) into the slave clock unit in order to synchronize the slave clock unit with the master clock unit     2025

ZS = Zero Symbol
ES = Exponential Symbol

SYNCHRONIZATION OF CLOCKS AND SENSORS VIA EXPONENTIAL-BASED TDR AND COMMUNICATION OF EXPONENTIAL-NULL PULSE SEQUENCES

PRIORITY CLAIM INFORMATION

This application claims priority to U.S. Provisional Application No. 62/387,341, filed Dec. 23, 2015, titled "Synchronization of Clocks via Exponential-Based TDR and Communication of Exponential-Null Pulse Sequences", by Robert H. Flake. That Provisional Application is hereby incorporated by reference in its entirety as though fully and completely set forth herein.

FIELD

The presently described embodiments relate to the field of clock synchronization, and more particularly, to a mechanism for synchronizing (with high resolution) a slave clock with a master clock by: exponential-based time domain reflectometry; and transmission of a time adjustment value using a pulse sequence that includes pulses of exponential kind and null symbols.

DESCRIPTION OF THE RELATED ART

In many situations, it is desirable to achieve a state of synchronization between two or more clocks, i.e., the condition wherein the two or more clocks will consistently report the same value of time when examined simultaneously. This state of synchronization may be difficult to achieve, especially when the two or more clocks are spatially distributed and/or connected via lossy electrical cables.

SUMMARY

In one set of embodiments, a method for synchronizing a master clock unit at a first location with a slave clock unit at a second location, different from the first location, is disclosed. The method may include transmitting a pulse P onto an electrical cable through a first end of the electrical cable. The electrical cable is sufficiently long to extend between the first location and the second location. (The first end is the end available at the first location.) A leading edge of the pulse P has an exponential shape with exponential coefficient value $\alpha$. For example, the leading edge may have the form:

$$P(t) = D^* \exp(\alpha t)$$

where D is a non-zero real constant value, and t is time. (The trailing edge of the pulse P may take any desired form.)

The method may further include measuring a round trip time-of-flight of the pulse P through the electrical cable, wherein the round trip time-of-flight is measured in terms of a number of clock cycles of the master clock unit. The pulse P makes a round trip from the first end to the second end, and back to the first end.

In some embodiments, a counter circuit that is driven by the master clock signal (i.e., the clock signal produced by the master clock) may be configured to start counting when the pulse P is transmitted onto the electrical cable and to stop counting when the pulse P returns from its round trip through the electrical cable. The final value of the counter circuit then reflects the round trip time of flight of the pulse P.

A threshold detection circuit, which is coupled to the first end of the electrical cable, may be used to detect when the pulse P (outgoing) is transmitted onto the electrical cable and when the pulse P returns from its round trip flight through the cable. The threshold detection circuit may assert an enable pulse for a first time when the leading edge of the outgoing version of the pulse P exceeds a threshold value, and then, assert the enable pulse for a second time when the leading edge of the return version of the pulse P exceeds the same threshold value. The above described counter circuit may be configured to start and stop counting based respectively on the first and second assertions of the enable pulse.

Because the pulse P has a leading edge of exponential shape with exponential coefficient $\alpha$, the leading edge propagates through the electrical cable without distortion of shape. Furthermore, the leading edge of the pulse P propagates with a velocity that is computable based on the electrical properties (such as resistance per unit length, capacitance per unit length, and inductance per unit length) of the electrical cable. These and other advantageous properties of the pulse P were discovered by Dr. Robert Flake, i.e., the inventor of the present patent).

The method may also include dividing the round trip time-of-flight by two to obtain a one-way time-of-flight. The one-way time-of-flight represents the time required for the pulse P to travel from the first end to the second end of the electrical cable (or vice versa).

The method may also include performing a first set of operations, e.g., using first circuitry situated at the first location. The first set of operations may include adding a current time value of the master clock unit to an adjustment value to obtain a resultant time value. The addition of the adjustment value accounts at least for the one-way time-of-flight through the electrical cable.

The first set of operations may also include transmitting a sequence of pulses onto the electrical cable through the first end of the electrical cable. Each of the pulses of said sequence is either a zero pulse or a pulse of exponential kind, depending on a respective bit in a binary representation of the resultant time value. Each pulse of exponential kind in the sequence of pulses has a leading edge that is exponentially shaped with the exponential coefficient value $\alpha$, i.e., the same value $\alpha$ defining the exponential shape of the leading edge of the pulse P. This sameness of exponential shape implies that leading edge of each pulse of exponential kind will propagate with the same velocity and the same one-way time-of-flight as the leading edge of the pulse P.

The method may also include performing a second set of operations, e.g., using second circuitry situated at the second location. The second set of operations may include:

receiving the sequence of pulses from a second end of the electrical cable (i.e, the end that is available at the second location);

converting the received sequence of pulses into a corresponding sequence of bits in order to recover the resultant time value, wherein each of the pulses of the received sequence determines a respective one of the bits in the sequence of bits; and  loading the resultant time value (or a value derived from the resultant time value) into the slave clock unit in order to synchronize the slave clock unit with the master clock unit. After loading the resultant time value (or the value derived from the resultant time value) into the slave clock unit, the slave clock time is brought into agreement with the master clock time, and one may properly interpret the slave clock unit and master clock unit as being unified under a synchronized time.

The techniques described above may be used to synchronize a plurality of slave clock units with a master clock unit. Each of the slave clock units would be synchronized with the master clock unit using the steps described above.

In some embodiments, the action of adding the adjustment value also accounts for a temporal length of the pulse sequence in terms of clock cycles of the master clock unit. (The last pulse of the pulse sequence arrives that the second end later than the first pulse. The time different between the last pulse and the first pulse represents the temporal length of the pulse sequence.

In some embodiments, the first circuitry is configured to transmit an action trigger time to the second circuitry, wherein the action trigger time is a future time value of the master clock at which the second circuitry is to perform an action (such as a data acquisition, signal generation, signal transmission, signal measurement, etc.), wherein said transmission of the action trigger time is performed after the resultant time value (or the value derived from the resultant time value) has been loaded into the slave clock unit.

In some embodiments, the action of loading the resultant time value (or the value derived from the resultant time value) may be interpreted as creating a synchronized time that is shared by the master clock unit and the slave clock unit. The first circuitry and second circuitry may each be configured to perform a respective action (such as data acquisition, signal generation, signal transmission, signal measurement, etc.) at a common value of the synchronized time. Alternatively, the first circuitry may be configured to perform a first action at a first value of the synchronized time, and the second circuitry may be configured to perform a second action at a second value of the synchronized time, wherein the first time and the second time are different, e.g., separated by a predetermined constant time delay.

In one set of embodiments, a method for synchronizing a master clock unit at a first location with a slave clock unit at a second location, different from the first location, is disclosed. The method may include performing operations using circuitry situated at the first location. The operations may include transmitting a sequence of pulses onto an electrical cable via a first end of the electrical cable, wherein each of the pulses of said sequence is either a zero pulse or a pulse of exponential kind, depending on a respective bit in a binary representation of a given time value, wherein each pulse of exponential kind in the sequence of pulses has a leading edge that is exponentially shaped with the exponential coefficient value $\alpha$.

In one set of embodiments, a method for synchronizing a master clock unit at a first location with a slave clock unit at a second location, different from the first location, is disclosed. The method may include performing operations using circuitry situated at the second location. The operations may include: receiving a sequence of pulses from an end of the electrical cable; converting the received sequence of pulses into a corresponding sequence of bits in order to recover a time value; and loading the time value into the slave clock unit in order to synchronize the slave clock unit with the master clock unit.

In one set of embodiments, a system for synchronizing a master clock unit at a first location with a slave clock unit at a second location, different from the first location, is disclosed. The system may include exponential waveform generation circuitry configured to transmit a first pulse onto an electrical cable through a first end of the electrical cable, wherein the electrical cable is sufficiently long to extend between the first location and the second location, wherein a leading edge of the first pulse has an exponential shape with exponential coefficient value $\alpha$.

The system may also include measurement circuitry configured to measure a round trip time-of-flight of the first pulse through the electrical cable, wherein the round trip time-of-flight is measured in terms of a number of clock cycles of the master clock unit; division circuitry configured to divide the round trip time-of-flight by two to obtain a one-way time-of-flight.

The system may also include first circuitry situated at the first location. The first circuitry may be configured to perform first operations including: adding a current time value of the master clock unit to an adjustment value to obtain a resultant time value, wherein said adding the adjustment value accounts at least for the one-way time-of-flight through the electrical cable; and transmitting a sequence of pulses onto the electrical cable through the first end of the electrical cable, wherein each of the pulses of said sequence is either a zero pulse or a pulse of exponential kind, depending on a respective bit in a binary representation of the resultant time value, wherein each pulse of exponential kind in the sequence of pulses has a leading edge that is exponentially shaped with the exponential coefficient value $\alpha$.

The system may also include second circuitry situated at the second location, and configured to perform second operations including: receiving the sequence of pulses from a second end of the electrical cable; converting the received sequence of pulses into a corresponding sequence of bits in order to recover the resultant time value; and loading the resultant time value (or a value derived from the resultant time value) into the slave clock unit in order to synchronize the slave clock unit with the master clock unit.

BRIEF DESCRIPTION OF THE DRAWINGS

A better understanding of the present invention can be obtained when the following detailed description of the preferred embodiments is considered in conjunction with the following drawings.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE EMBODIMENTS

INCORPORATIONS BY REFERENCE

The following patents are hereby incorporated by reference in their entireties as though fully and completely set forth herein.

U.S. Pat. No. 6,441,695, filed on Mar. 7, 2000, entitled "Methods for Transmitting a Waveform Having a Controllable Attenuation and Propagation Velocity", invented by Robert H. Flake;

U.S. Pat. No. 6,847,267, filed on Aug. 20, 2002, "Methods for Transmitting a Waveform Having a Controllable Attenuation and Propagation Velocity", invented by Robert H. Flake and John F. Biskup;

U.S. Pat. No. 7,375,602, filed on Dec. 10, 2004, entitled "Methods for Propagating a Non Sinusoidal Signal Without Distortion in Dispersive Lossy Media", invented by Robert H. Flake, John F. Biskup, and Su-liang Liao;

U.S. Pat. No. 7,859,271, filed on Mar. 26, 2008, entitled "Methods for Propagating a Non Sinusoidal Signal Without Distortion in Dispersive Lossy Media", invented by Robert H. Flake and John F. Biskup;

U.S. Pat. No. 8,093,911, filed on Oct. 26, 2010, entitled "Time-of-Flight Measurement Based on Transfer Function and Simulated Exponential Stimulus", invented by Robert H. Flake, John F. Biskup, and Su-hang Liao;

U.S. Pat. No. 8,867,657, filed on Feb. 17, 2014, entitled "Communication Using Analog Pulses Having Exponentially-Shaped Leading Edges", invented by Robert H. Flake; and U.S. Pat. No. 8,923,444, filed on Jun. 30, 2014, entitled "Decoding a Communication Signal That Contains Analog Pulses with Exponentially-Shaped Leading Edge.

U.S. Pat. No. 9,331,842, filed on Sep. 23, 2015, entitled "Time Synchronization and Controlled Asynchronization of Remote Trigger Signals.

The following technical publication is also incorporated by reference in its entirety as though fully and completely set forth herein: Physics Letters A, Volume 380, Issues 5-6, 15 Feb. 2016, Pages 635-639, "Heaviside Revisited: Distortionless Signal Transmission Through Lossy Media with Application to Precision Clock Synchronization.

Terminology

A signal that includes a portion of the form $D*\exp(\alpha t)$ for some non-zero real constant $D$ and some positive real constant $\alpha$ is referred to herein as a "speedy delivery (SD) signal".

A technology that is based on use of the SD signal is referred to herein as SD technology.

A memory medium is a non-transitory medium configured for the storage and retrieval of information. Examples of memory media include: various kinds of semiconductor-based memory such as RAM and ROM; various kinds of magnetic media such as magnetic disk, tape, strip and film; various kinds of optical media such as CD-ROM and DVD-ROM; various media based on the storage of electrical charge and/or any of a wide variety of other physical quantities; media fabricated using various lithographic techniques; etc. The term "memory medium" includes within its scope of meaning the possibility that a given memory medium might be a union of two or more memory media that reside at different locations, e.g., on different chips in a system or on different computers in a network. In some embodiments, a memory medium may be a flash memory A non-transitory memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

A computer system is any device (or combination of devices) having at least one processor that is configured to execute program instructions stored on a memory medium. Examples of computer systems include personal computers (PCs), workstations, laptop computers, tablet computers, mainframe computers, server computers, client computers, network or Internet appliances, hand-held devices, mobile devices, personal digital assistants (PDAs), tablet computers, computer-based television systems, grid computing systems, wearable devices, computers implanted in living organisms, computers embedded in head-mounted displays, computers embedded in sensors forming a distributed network, etc.

A programmable hardware element (PHE) is a hardware device that includes multiple programmable function blocks connected via a system of programmable interconnects. Examples of PHEs include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores).

In some embodiments, a computer system may be configured to include a processor (or a set of processors) and a memory medium, where the memory medium stores program instructions, where the processor is configured to read and execute the program instructions stored in the memory medium, where the program instructions are executable by the processor to implement a method, e.g., any of the various method embodiments described herein, or, any combination of the method embodiments described herein, or, any subset of any of the method embodiments described herein, or, any combination of such subsets.

Figure 1:
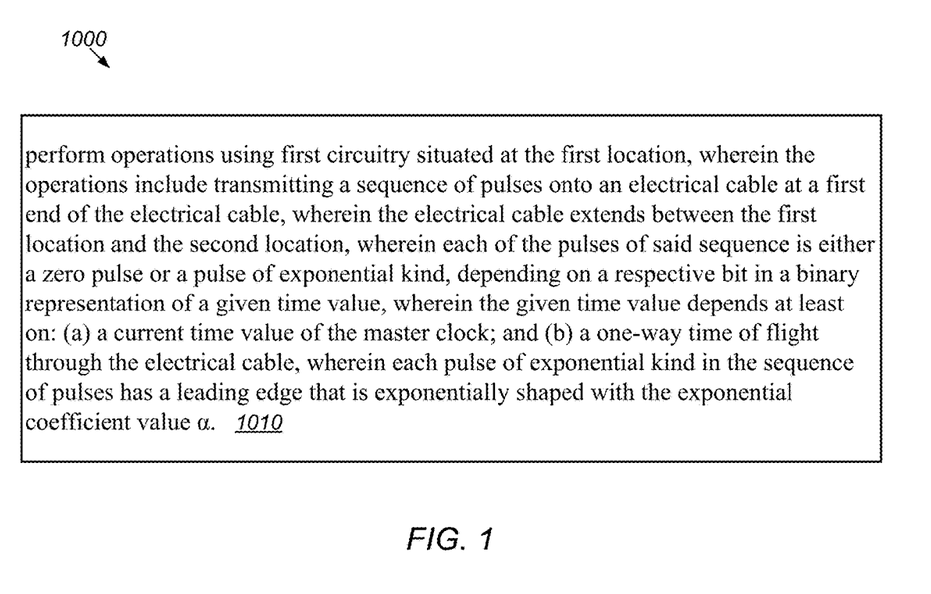
FIG. 1 illustrates one embodiment of a transmitter-oriented method for facilitating synchronization of a slave clock unit with a master clock unit.

In one set of embodiments, a method 1000 may be performed as shown in FIG. 1. (The method 1000 may also include any subset of the features, elements and embodiments described below in connection with FIGS. 2-6B.) The method 1000 is for facilitating synchronization of a master clock unit at a first location with a slave clock unit at a second location, different from the first location.

At 1010, the method may include performing operations using first circuitry situated at the first location. The operations may include transmitting a sequence of pulses onto an electrical cable at a first end of the electrical cable. The electrical cable extends between the first location and the second location. Each of the pulses of said sequence is either a zero pulse or a pulse of exponential kind, depending on a respective bit in a binary representation of a given time value. The given time value depends at least on: (a) a current time value of the master clock; and (b) a one-way time of flight through the electrical cable. Each pulse of exponential kind in the sequence of pulses has a leading edge that is exponentially shaped with the exponential coefficient value $\alpha$. The exponential coefficient value $\alpha$ is a positive real constant.

In some embodiments, prior to the pulse sequence transmission 1010, the method 1000 may include: transmitting a pulse P onto the electrical cable at the first end of the electrical cable, wherein a leading edge of the pulse P has the exponential shape with exponential coefficient value $\alpha$; measuring a round trip time-of-flight of the pulse P through the electrical cable, wherein the round trip time-of-flight is measured in terms of a number of clock cycles of the master clock unit; and dividing the round trip time-of-flight by two to obtain the one-way time-of-flight. The round-trip time of flight is the time required for the pulse P to travel from the first end to the opposite end of the electrical cable and then back to the first end. The transmission of the pulse P and the measurement of the round-trip time-of-flight may be performed by an enhanced TDR instrument as described below in the section titled "Time-Domain Reflectometry".

In some embodiments, the exponential leading edge of the transmitted pulse P persists for time duration $t_p$ so that the product $\alpha t_p$ is approximately equal to $2\pi$ (or approximately equal to six). This constraint may be imposed to allow the exponential leading edge to attain a steady state condition. (The same constraint may be imposed on the exponential leading edge of each pulse of exponential kind in the pulse sequence of FIG. 1.) For example, in one embodiment, $\alpha t_p$ is a value in the range [6.0, 6.3]. In another embodiment, $\alpha t_p$ is a value in the range [5.5, 6.5]. In yet another embodiment, $\alpha t_p$ is a value in the range [5.0, 7.0].

The exponential leading edge of the pulse P may conform to the expression $D_P * \exp(\alpha t)$. The multiplicative amplitude constant $D_P$ may be computed based on equation: $D_P * \exp(6) = V_P$, where $V_P$ is the peak amplitude of the exponential leading edge, i.e., the amplitude achieved at the end of the exponential leading edge. (In other embodiments, the constant value 6 is replaced by another constant value, e.g., the value $2\pi$, or a value in any of the ranges described above.) For example, if the peak amplitude $V_P$ is 1 volt, then $D_P = (1 \text{ volt})(\exp(-6))$. The multiplicative amplitude constant for the exponential leading edge of the pulse of exponential kind in the pulse sequence of FIG. 1 may be similarly computed. However, there is no general constraint that the pulse P and the pulse of exponential kind must have the same value of peak amplitude.

In some embodiments, the pulse P is transmitted a plurality of times, and a round-trip time-of-flight is determined for each transmission. The one-way time of flight may then be determined by averaging the round-trip times-of-flight and then dividing by two. Alternatively, the division by two may precede the averaging step.

In some embodiments, an accurate round-trip time-of-flight (TOF) between the transmitted pulse and the return pulse may be computed by averaging a plurality of amplitude-specific TOF values. Having captured (e.g., using a digital oscilloscope) a set of samples representing the transmitted pulse and a set of samples representing the returned pulse, a computer may compute a time separation value $\Delta(A_i)$ for each amplitude $A_i$ in a set of amplitudes $$\{A_i: i=1, 2, \ldots, N\}.$$

The set of amplitudes may be designed to span a range $[A_{LB}, A_{UB}]$, which is a subrange of the amplitude range of the leading edge of the return pulse. Each separation value $\Delta(A_i)$ is a measure of the time separation between (a) the time at which the leading edge of the transmitted pulse crosses the amplitude $A_i$ and (b) the time at which the leading edge of the return pulse crosses the amplitude $A_i$. Because the leading edge of the return pulse has the same shape as the leading edge of the transmitted pulse, the time separation values $\Delta(A_i)$, $i=1, 2, \ldots, N$, are nominally equal except for noise variations. Thus, a more accurate estimate of the time of flight may be determined by averaging the computed separation values $\Delta(A_i)$, $i=1, 2, \ldots, N$.

Figure 1B:
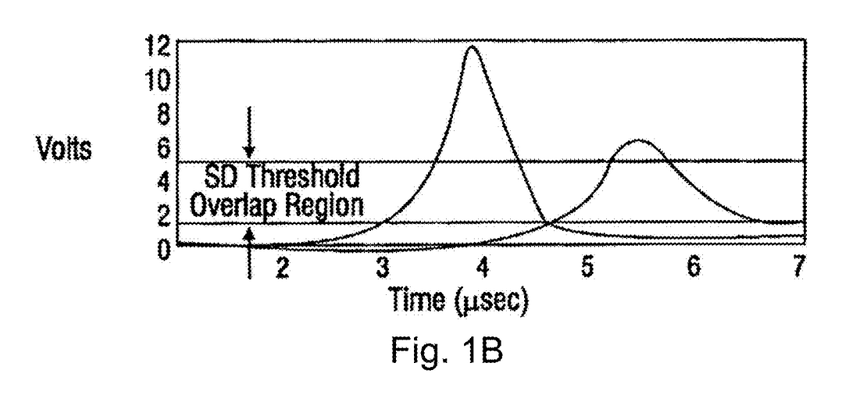
FIG. 1B illustrates an applied speedy delivery pulse (at left) and a corresponding output pulse (at right), in a time-domain transmission experiment.
Figure 1C:
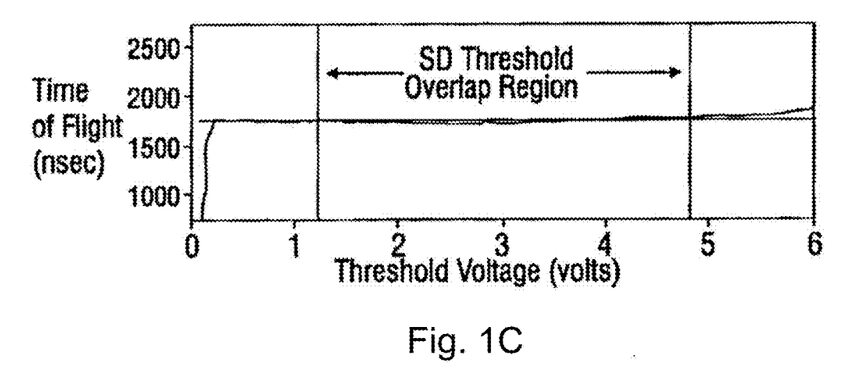
FIG. 1C is a graph of time of flight versus amplitude threshold for the pulses of FIG. 1B.

In some embodiments, the amplitude range $[A_{LB}, A_{UB}]$ over which the separation values $\{\Delta(A_i)\}$ are collected is determined as follows. (The subscript "LB" is mean to suggest "lower bound", and the subscript "UB" is meant to suggest "upper bound".) Based on captured samples of the transmitted pulse and the captured samples of the return pulse, a computer may determine separation values $\{\Delta(Vi), i=1, 2, \ldots, M\}$ for amplitudes $\{Vi, i=1, 2, \ldots, M\}$ spanning the amplitude range [Vmin, Vmax], where Vmax is less than or equal to the amplitude of the peak of the leading edge of the return pulse, and Vmin is an amplitude near zero. $\Delta(Vi)$ is defined as the time separation between (a) the time at which the leading edge of the transmitted pulse crosses the amplitude Vi and (b) the time at which the leading edge of the return pulse crosses the amplitude Vi. When the threshold amplitude V is sufficiently greater than zero and sufficiently less than Vmax, the time of flight is relatively constant. (See, e.g., FIGS. 1B and 1C. FIG. 1B illustrates an example of a transmitted pulse (at left) and an output pulse (at right), and FIG. 1C shows the corresponding graph of time-of-flight versus voltage threshold, i.e., $\Delta(V)$ versus V. While FIGS. 1B and 1C relate to a time-domain transmission experiment, the results for a time-domain transmission experiment would be similar in principle.) It is within this relatively constant TOF region that the user may select the range $[A_{LB}, A_{UB}]$. The computer may provide a user interface through which the user may select the upper bound $A_{UB}$ and the lower bound $A_{LB}$. In alternative embodiments, the computer may select the upper bound $A_{UB}$ and the lower bound $A_{LB}$ using an automated selection algorithm.

In some embodiments, the given time value of FIG. 1 is a sum of at least: (a) the current time value of the master clock; and (b) a number of clock cycles of the master clock corresponding to the one-way time of flight through the electrical cable.

In some embodiments, the sum also includes: (c) a value that accounts for a temporal length of the pulse sequence in terms of clock cycles of the master clock unit.

In some embodiments, said first circuitry includes a digital adder circuit configured to calculate said sum.

In some embodiments, the first circuitry includes a digital-to-analog conversion (DAC) circuit, wherein each pulse of exponential kind in said sequence of pulses is generated by applying a set of sample values to the DAC circuit.

In some embodiments, each pulse of exponential kind in said sequence of pulses is generated by an analog circuit including an analog integrator and an analog amplifier, wherein an output of the analog amplifier is coupled to an input of the analog integrator.

In some embodiments, each pulse of exponential kind in said sequence of pulses is generated by applying a linear ramp signal to an analog circuit element whose current-voltage characteristic is exponentially shaped.

In some embodiments, each pulse of exponential kind in said sequence of pulses is generated by: generating a plurality of analog signals corresponding respectively to terms in a Taylor series approximation of an exponential function; and adding the plurality of analog signals using an analog addition circuit.

In some embodiments, the slave clock unit is used to control timing (e.g., a start time and/or an end time) of a process at or near the second location. In some embodiments, the process includes one or more of the following:
  a measurement of one or more physical quantities;
  an analog-to-digital conversion of a signal received by a receiver;
  a purchase of an item from an online exchange or marketplace;
  a transmission of a radio signal into space;
  a transmission of an electrical signal onto an electrically conductive medium;
  a transmission of an optical signal onto an optical fiber.

In some embodiments, the master clock unit is used to control timing of a first process at or near the first location, and the slave clock unit is used to control timing of a second process at or near the second location. The first process and the second process may each include any one or more of the processes described above.

In some embodiments, the operations also include transmitting an action trigger time (e.g., using a second sequence of pulses that is transmitted through the electrical cable) to second circuitry at the second location. The action trigger time is a future time value of the master clock unit at which second circuitry at the second location is to perform an action (such as a data acquisition, signal generation, signal transmission, signal measurement, etc.). The action trigger time is transmitted after the transmission of the sequence of pulses, in order to allow the receiver time to achieve synchronization based on the sequence of pulses.

In one set of embodiments, a system for facilitating synchronization of a master clock unit at a first location with a slave clock unit at a second location, different from the first location, may be configured as follow.

The system may include first circuitry situated at the first location and configured to perform operations including transmitting a sequence of pulses onto an electrical cable at a first end of the electrical cable, wherein the electrical cable extends between the first location and the second location, wherein each of the pulses of said sequence is either a zero pulse or a pulse of exponential kind, depending on a respective bit in a binary representation of a given time value. The given time value depends at least on: (a) a current time value of the master clock; and (b) a one-way time of flight through the electrical cable, wherein each pulse of exponential kind in the sequence of pulses has a leading edge that is exponentially shaped with the exponential coefficient value $\alpha$.

In some embodiments, the system may also include: (1) transmission circuitry configured to transmit a first pulse onto the electrical cable at the first end of the electrical cable, wherein a leading edge of the first pulse has the exponential shape with exponential coefficient value $\alpha$; (2) measurement circuitry configured to measure a round trip time-of-flight of the first pulse through the electrical cable, wherein the round trip time-of-flight is measured in terms of a number of clock cycles of the master clock unit; and (3) division circuitry configured to divide the round trip time-of-flight by two to obtain the one-way time-of-flight.

In some embodiments, the given time value is a sum of at least: (a) the current time value of the master clock; and (b) a number of clock cycles of the master clock corresponding to the one-way time of flight through the electrical cable.

In some embodiments, the sum also includes: (c) a value that accounts for a temporal length of the pulse sequence in terms of clock cycles of the master clock unit.

In some embodiments, the first circuitry includes a digital-to-analog conversion (DAC) circuit, wherein each pulse of exponential kind in said sequence of pulses is generated by applying a set of sample values to the DAC circuit.

In some embodiments, the slave clock is used to control timing (e.g., a start time and/or an end time) of a process at or near the second location.

In some embodiments, the process includes one or more of the following:
  a measurement of one or more physical quantities;
  an analog-to-digital conversion of a signal received by a receiver;
  a digital-to-analog conversion of a sequence of samples, to obtain an analog signal;
  a purchase of an item from an online exchange or online marketplace;
  a transmission of a radio signal into space;
  a transmission of an electrical signal onto an electrically conductive medium;
  a transmission of an optical signal onto an optical fiber;
  a transmission of a laser signal into space.

In some embodiments, the master clock unit is used to control timing of a first process at or near the first location, wherein the slave clock unit is used to control timing of a second process at or near the second location.

In some embodiments, the operations also include transmitting an action trigger time (e.g., using a second sequence of pulses that is transmitted through the electrical cable) to second circuitry at the second location, wherein the action trigger time is a future time value of the master clock unit at which second circuitry at the second location is to perform an action (such as a data acquisition, signal generation, signal transmission, signal measurement, etc.), wherein the first circuitry is configured to transmit the action trigger time after the transmission of the sequence of pulses.

Figure 2:
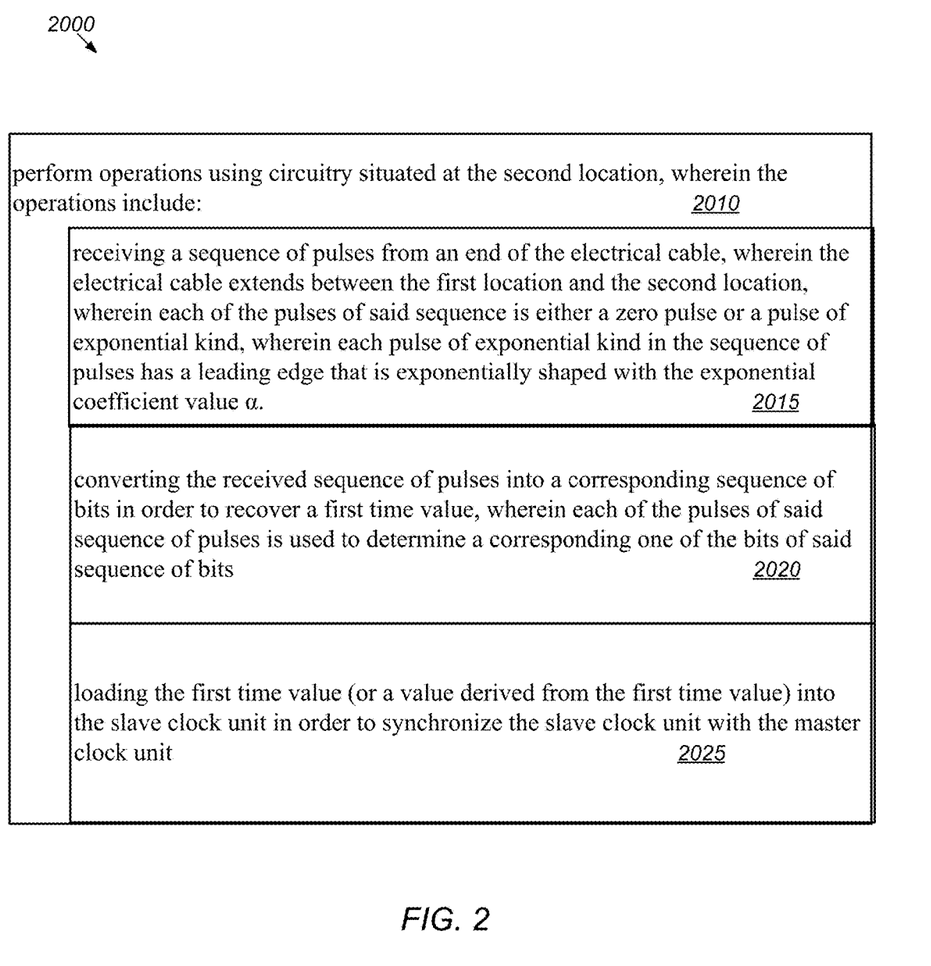
FIG. 2 illustrates one embodiment of a receiver-oriented method for facilitating synchronization of a slave clock unit with a master clock unit.

In one set of embodiments, a method 2000 may be performed as shown in FIG. 2. (The method 2000 may also include any subset of the features, elements and embodiments described above in connection with FIG. 1 and described blow in connection with FIGS. 3-6B.) The method 2000 is for facilitating synchronization of a master clock unit at a first location with a slave clock unit at a second location, different from the first location.

At 2010, the method includes performing operations using circuitry situated at the second location, wherein the operations include operations 2015-2025 described below.

At 2015, a sequence of pulses may be received from an end of the electrical cable. The electrical cable extends between the first location and the second location. Each of the pulses of said sequence is either a zero pulse or a pulse of exponential kind, wherein each pulse of exponential kind in the sequence of pulses has a leading edge that is exponentially shaped with the exponential coefficient value $\alpha$.

At 2020, the received sequence of pulses may be converted into a corresponding sequence of bits in order to recover a first time value, wherein each of the pulses of said sequence of pulses is used to determine a corresponding one of the bits of said sequence of bits;

At 2025, the first time value (or a value derived from the first time value) may be loaded into the slave clock unit in order to synchronize the slave clock unit with the master clock unit.

In some embodiments, the first time value is a sum of at least:
(a) a time value of the master clock; and
(b) a number of clock cycles of the master clock corresponding to a one-way time of flight through the electrical cable.

In some embodiments, the sum also includes: (c) a value that accounts for a temporal length of the pulse sequence in terms of clock cycles of the master clock unit.

In some embodiments, the operations also include receiving a signal (e.g., a second sequence of pulses of mixed zero-exponential kind) from the end of the electrical cable, wherein the signal indicates an action trigger time, wherein the action trigger time is a future time value of the master clock unit at which said circuitry is to perform an action (such as a data acquisition, signal generation, signal transmission, signal measurement, etc.).

In some embodiments, said circuitry (i.e., the circuity of step 2010) may include threshold detection circuitry, which is configured to perform said converting by determining, for each pulse of the pulse sequence, whether the pulse exceeds a threshold.

In some embodiments, the threshold is programmable.

In some embodiments, after said loading of the first time value into the slave clock unit, the slave clock unit is used to control timing (e.g., a start time and/or an end time) of a process at or near the second location.

In some embodiments, the process includes one or more of the following:
a measurement of one or more physical quantities;
an analog-to-digital conversion of a signal received by a receiver;
a purchase of an item from an online exchange or marketplace;
a transmission of a radio signal into space;
a transmission of an electrical signal onto an electrically conductive medium;
a transmission of an optical signal onto an optical fiber.

The action of loading of the first time value into the slave clock unit establishes a synchronization of the slave clock unit to the master clock unit. In some embodiments, after said loading of the first time value into the slave clock unit, the master clock unit is used to control timing of a first process at or near the first location, and/or, the slave clock unit is used to control timing of a second process at or near the second location.

In some embodiments, an offset value is added to the first time value prior to loading the first time value into the slave clock unit, wherein the offset value accounts for a delay between: a time when the sequence of pulses arrives at the end of the electrical cable; and a time when said loading of the first time value into the slave clock is completed.

In some embodiments, the circuitry is included in a satellite (e.g., a GPS satellite or a GLONASS satellite) or a vehicle or a radio or a robot or a data acquisition system or signal generator or a sound synthesizer. GPS is an acronym for "Global Positioning System". GLONASS is an acronym for "Global Navigation Satellite System".

Time-Domain Reflectometry (TDR)

Technological applications that exploit unique advantages of SD signal transmission may be sought in time-domain metrology (TDM), notably in the subfield of Time Domain Reflectometry. A Time Domain Reflectometer (TDR) is an instrument that operates much like radar, in which a measurement of the travel time of an electromagnetic signal to a target and back is used, together with the propagation velocity of the signal in air, to determine the distance to a target. TDRs apply an analogous strategy to detect and locate faults in electrical cables, among other TDM tasks. However, no commercial TDR technology utilizes a distortion-free pulse. Significant improvements in both resolution and reliability may therefore be achieved with the incorporation of SD signal processing in TDR design.

Figure 3:
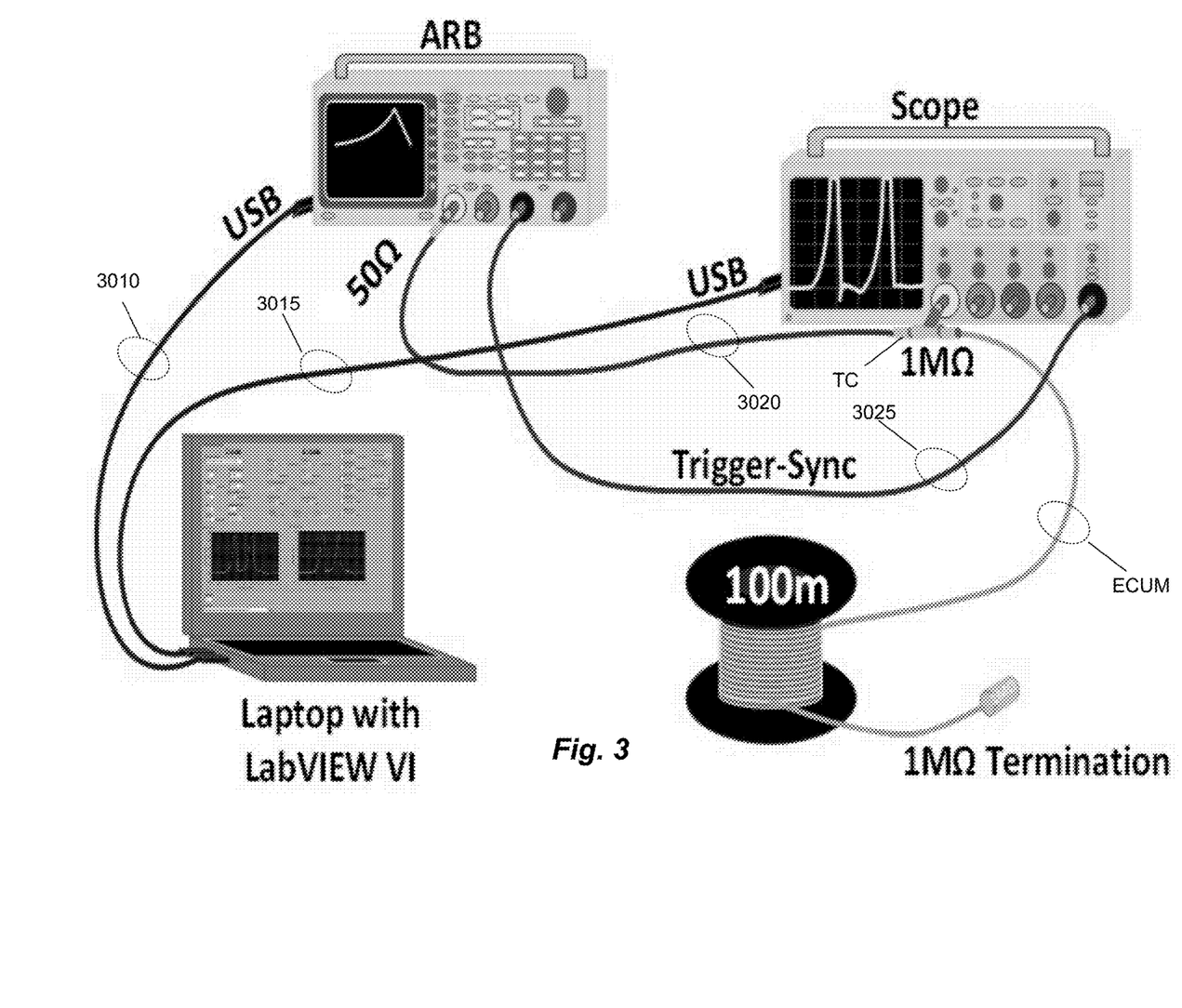
FIG. 3 illustrates a laboratory setup for performing enhanced Time-Domain Reflectometry (TDR), wherein the qualifier "enhanced" implies use of the Speedy Delivery (SD) pulse, whose leading edge is exponentially shaped.

A series of tests was carried out to demonstrate the merits of such an enhanced TDR (e-TDR) for time-of-flight (TOF) measurement, based on the experimental arrangement shown in FIG. 3. An arbitrary waveform generator (ARB) generates an SD pulse. The SD pulse is carried to an end of an electrical cable under measurement (ECUM) through a cable 3020 and a T-connector (TC). The T-connector couples to an end of the cable 3020, the end of the electrical cable under measurement, and an input port of the digital oscilloscope (Scope). The electrical cable under measurement is nominally 100 meters in length, and is wound on a spool. The digital oscilloscope is configured to capture the SD pulse as it is initially applied to the ECUM and as it returns from the round trip flight through the ECUM. The ECUM is terminated at its remote end with a 1 MOhm termination. A laptop computer is coupled to the ARB and the Scope via USB cables 3010 and 3015. The laptop computer is configured with a LabVIEW virtual instrument (VI), that enable the laptop computer to serve as a controller for the enhanced TDR process. The ARB supplies the Scope with a trigger-synch signal via cable 3025, indicating when the SD pulse is being generated and applied to the ECUM. While the experimental arrangement of FIG. 3 involves specific choices for operational parameters (1 MOhm, 100 m, 50 Ohms) and system components (LabVIEw VI, laptop, USB, digital oscilloscope, arbitrary waveform generator), the presently described enhanced TDR is not limited to these specific choices.

Figure 4:
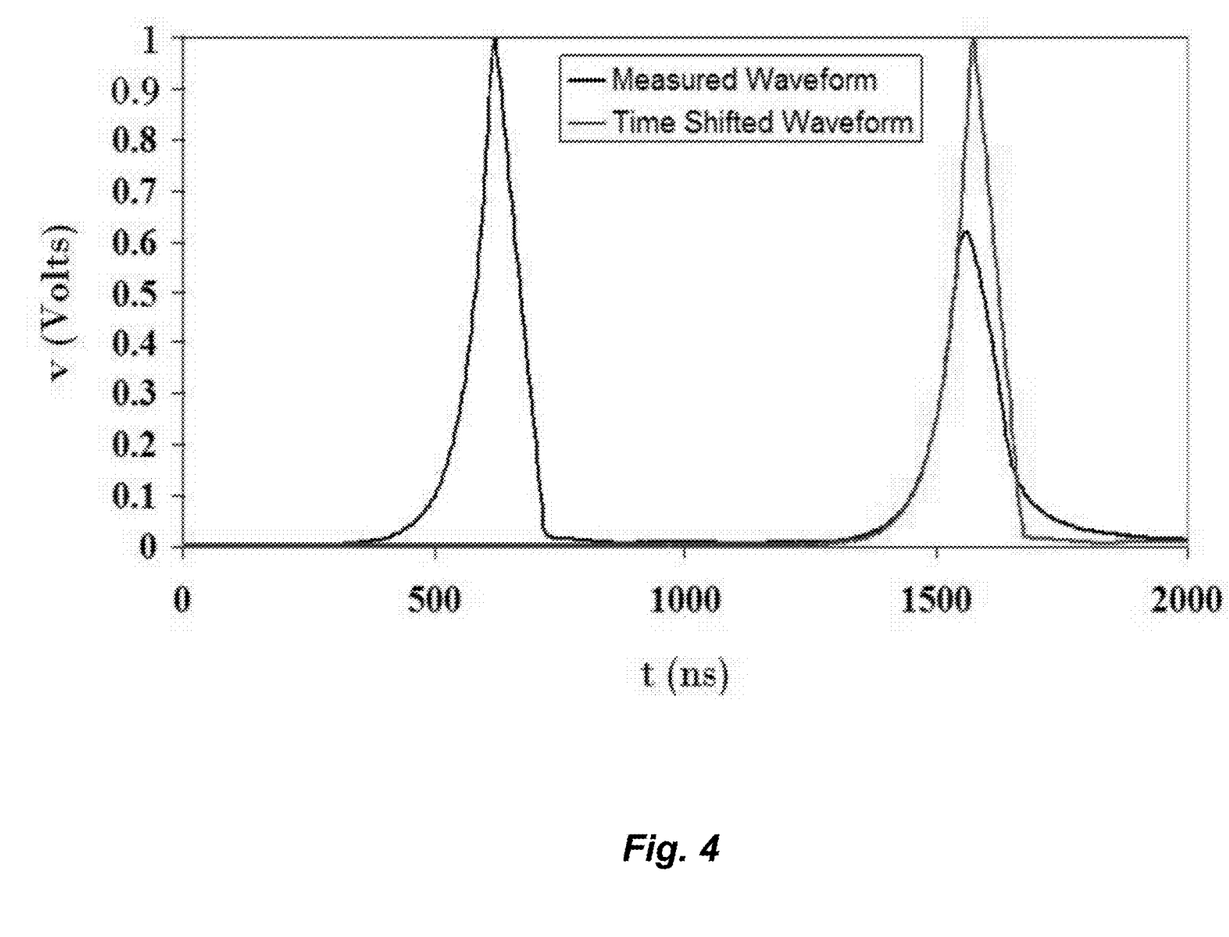
FIG. 4 shows an SD pulse (at left) that is applied to the 100 meter cable of FIG. 3, and the return pulse (smaller pulse at right) after a round-trip flight through the 100 meter cable.
Figure 5:
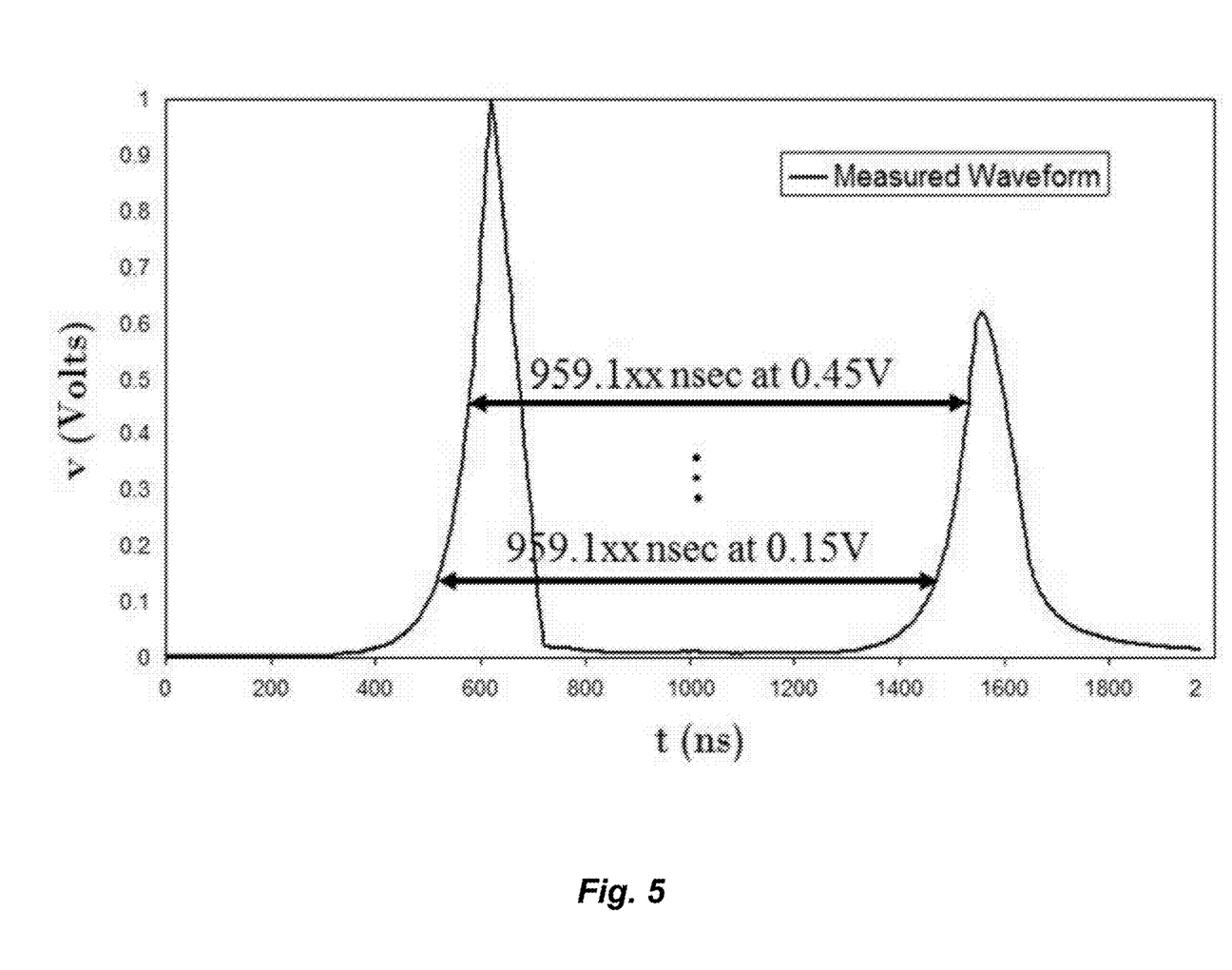
FIG. 5 illustrates a process where the time of flight between applied SD pulse and return SD pulse is measured for each of a plurality of voltage thresholds. The times of flight are then averaged to obtain a more reliable estimate of the time of flight between the applied SD pulse and the return SD pulse.

FIGS. 4 and 5 present typical results from an initial experimental study. Referring to FIG. 4, an SD pulse (left waveform) was applied to the input end of an RG-58/U coaxial cable of length 100 meters having a 1 MΩ termination. On arriving at the termination end, the signal was reflected and returned to the transmission end, where it was absorbed and appeared on the TDR scan of FIG. 4 as the attenuated right pulse. For reference, a time-shifted copy of the input wave pulse is superimposed upon the reflected waveform. The exponentially rising front edge of the input SD pulse is well preserved in the reflected pulse, although the trailing part of the propagating signal has become distorted due to the necessary truncation of the input waveform.

Referring to FIG. 5, the two-way TOF (also referred to herein as the "round trip TOF") of the signal was determined by measuring the difference between the times at which the leading edges of the two pulses (applied and reflected) cross a selected reference threshold voltage level $v_\theta$. There is inevitably some variance in successive measurements of the time delay on the line (i.e., the electrical cable). The measurement was repeated for a total of 200 different threshold values $v_\theta$ between 0.15 V and 0.45 V. The results were averaged to obtain a quite precise estimate of the TOF. The variance or standard deviation associated with this set of measurements provides an appropriate quantification of "jitter" in the TDR application. The set of 200 measurements showed very small variance because the time differences for threshold crossings on the leading edges of applied and returned pulses were nearly identical at each threshold level. (This is a consequence of the preservation of shape of the exponential leading edge during propagation of SD pulse.) All trials employed an SD pulse with the parameter D having a value such that the peak input amplitude $v_c = De^{2\pi}$ equals 1 Volt with the parameter $\alpha = 10.0\ \mu s^{-1}$ satisfying $\alpha T = 2\pi$. The performance of the e-TDR on the time-of-flight task was further evaluated in a number of runs of 100 independent TOF measurements carried out on the same 100 meter RG-58/U cable over a two-week period in the same laboratory. Summarizing the findings of all runs made, the uncertainty in the TOF as measured by the standard deviation (jitter) is under 9 ps with 99.9% confidence level. (ps is an acronym for picoseconds. One picosecond is equal to $10^{-12}$ seconds, i.e., one trillionth of a second.)

Clock Synchronization Application

The SD signal has a natural application in communication mediated by analog pulses, i.e., analog pulses having exponential leading edges, which travel with constant velocity. This utility is exemplified in the task of subnanosecond real-time clock synchronization (RTCS). The objective is to match, with subnanosecond precision, the times of slave clocks in a network of transmission lines with the time of a master clock. As a means of correlating decentrally-detected physical variables, RTCS has many important applications in engineering and science; examples of the latter are prominent in high-energy physics (e.g., experiments at the Large Hadron Collider), geophysics (e.g., localization of earthquake centers), and astrophysics (e.g., in long-baseline observations).

Figure 6A:
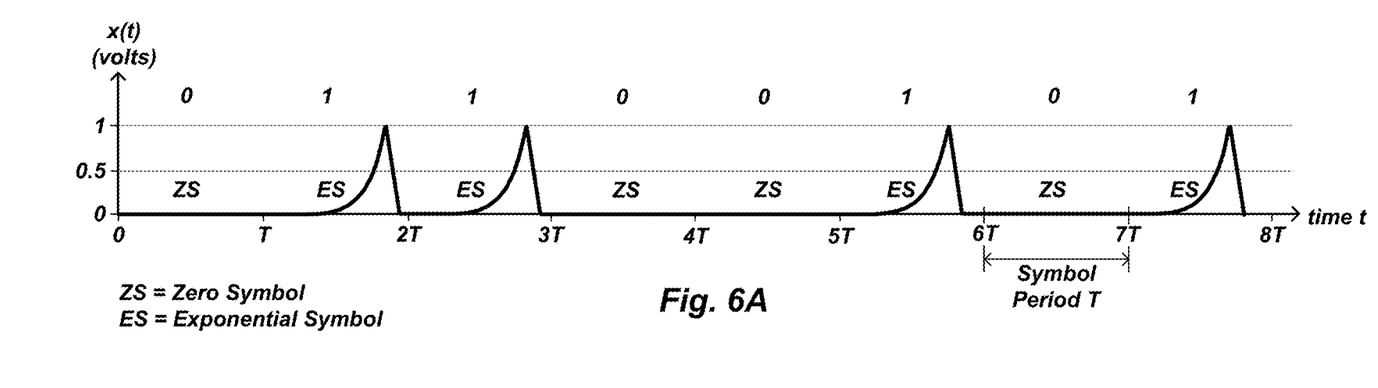
FIGS. 6A and 6B illustrate a system and method for synchronizing a slave clock with a master clock, according to one set of embodiments.
Figure 6B:
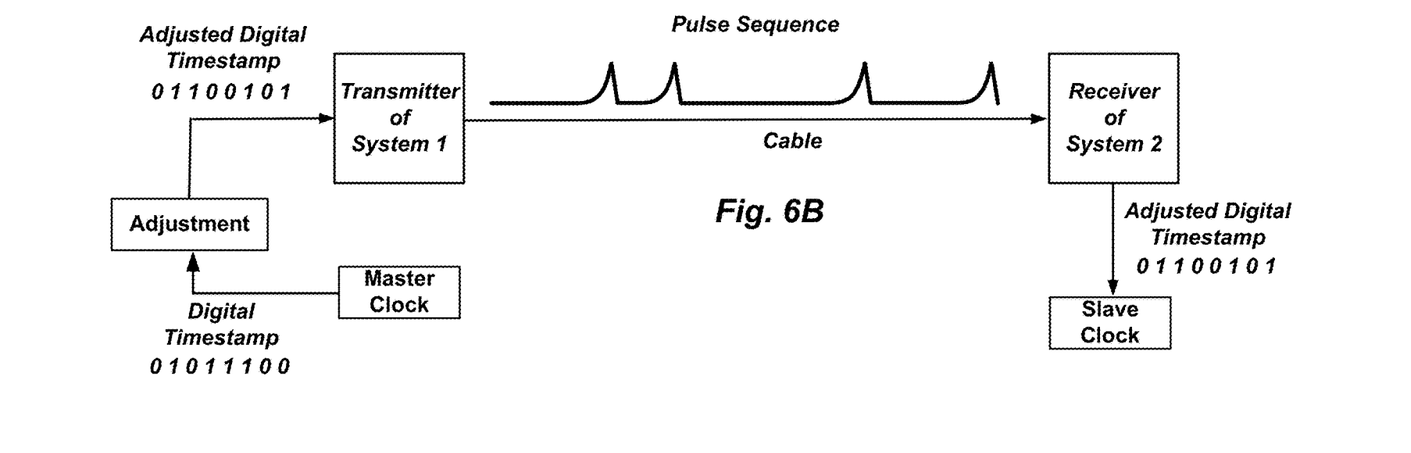

Consider, for simplicity, a network involving one master clock connected with one slave clock, located some distance apart in Systems 1 and 2, respectively (see FIG. 6B). In the conventional terminology of digital communication, the symbol period is defined as the temporal width of the dispersive rectangular pulse signal. In analog communication based on the SD signal, the symbol period may be defined as the temporal duration T of the signal's forward exponential edge and its return to zero amplitude (see FIG. 3A).

Referring to FIGS. 6A and 6B, synchronization may be achieved by the following procedure.

(i) In a first step, one performs an enhanced-TDR (e-TDR) measurement on the interconnect between the two clocks, e.g., as in the time-of-flight (TOF) measurements described in the "Time-Domain Reflectometry" section, the laboratory setup being depicted in FIG. 3.

(ii) The two-way travel time thus determined is divided by two, yielding a precise measurement of the delay (i.e., the one-way time-of-flight) associated with the line between the clocks.

(iii) This cable delay and the master clock time stamp are summed and the result converted from a decimal to a binary stream. See FIG. 6B.

(iv) In turn, the binary stream is converted to a stream of SD pulses, which is sent by the transmitter of System 1 to the receiver of System 2; there it is reconverted to binary and synchronized time is downloaded to the slave clock. See FIG. 6B.

The principal feature that favors the use of coded SD pulses in this application lies in the precisely measured time delay for the round trip of the SD pulse from master clock to slave clock and back. As described in the section titled "Time-Domain Reflectometry", the exceptional precision attained in the e-TDR TOF measurement thus performed (subnanosecond, even few picosecond) is made possible by the invariance of a substantial portion of the leading edge of the constant-velocity SD pulse. Accordingly, jitter is kept under control, greatly enhancing the accuracy of synchronization of the slave clock with the master clock. Moreover, the stability of the precision of e-TDR delay-time measurements, as demonstrated over a period of several days in the runs described in the section titled "Time-Domain Reflectometry", gives assurance of its maintenance during synchronization updates. The feature of one-way communication made possible by the equal travel time of the SD pulse along forward and return paths offers an additional advantage in reduced complexity of hardware and software. (It should be noted that an attempt to achieve the same degree of resolution in such a TDR measurement employing a traditional rectangular pulse would be frustrated by the severe distortion experienced by the pulse during propagation, resulting in relatively high jitter.)

In one set of embodiments, a system for facilitating synchronization of a master clock unit at a first location with a slave clock unit at a second location, different from the first location, may be configured as follows.

The system may include circuitry situated at the second location and configured to perform operations including: (1) receiving a sequence of pulses from an end of the electrical cable, wherein the electrical cable extends between the first location and the second location, wherein each of the pulses of said sequence is either a zero pulse or a pulse of exponential kind, wherein each pulse of exponential kind in the sequence of pulses has a leading edge that is exponentially shaped with the exponential coefficient value $\alpha$; (2) converting the received sequence of pulses into a corresponding sequence of bits in order to recover a first time value, wherein each of the pulses of said sequence of pulses is used to determine a corresponding one of the bits of said sequence of bits; and (3) loading the first time value (or a value derived from the first time value) into the slave clock unit in order to synchronize the slave clock unit with the master clock unit.

In some embodiments, the first time value is a sum of at least: (a) a time value of the master clock; and (b) a number of clock cycles of the master clock corresponding to a one-way time of flight through the electrical cable.

In some embodiments, the sum also includes: (c) a value that accounts for a temporal length of the pulse sequence in terms of clock cycles of the master clock unit.

In some embodiments, the operations also include receiving a signal (e.g., a second sequence of pulses of mixed zero-exponential kind) from the end of the electrical cable, wherein the signal indicates an action trigger time, wherein the action trigger time is a future time value of the master clock unit at which said circuitry is to perform an action (such as a data acquisition, signal generation, signal transmission, signal measurement, etc.).

In some embodiments, said circuitry includes threshold detection circuitry, which is configured to perform said converting by determining, for each pulse of the pulse sequence, whether the pulse exceeds a threshold.

In some embodiments, the threshold is programmable.

In some embodiments, after said loading of the first time value into the slave clock, the slave clock is used to control timing (e.g., a start time and/or an end time) of a process at or near the second location.

In some embodiments, the process may include one or more of the following:

a measurement of one or more physical quantities;

an analog-to-digital conversion of a signal received by a receiver;

a digital-to-analog conversion of a sequence of samples, to obtain an analog signal;

a purchase of an item from an online exchange or online marketplace;

a transmission of a radio signal into space;

a transmission of an electrical signal onto an electrically conductive medium;

a transmission of an optical signal onto an optical fiber;

a transmission of a laser signal into space.

The action of loading the first time value into the slave clock unit establishes a synchronization of the slave clock to the slave clock. In some embodiments, after said loading of the first time value into the slave clock unit, the master clock unit is used to control timing of a first process at or near the first location, and/or, the slave clock unit is used to control timing of a second process at or near the second location.

In some embodiments, an offset value is added to the first time value prior to loading the first time value into the slave clock, wherein the offset value accounts for a time delay between:

a time when the sequence of pulses arrives at the end of the electrical cable; and a time when said loading of the first time value into the slave clock is to be completed.

In some embodiments, the circuitry is included in a satellite (e.g., a GPS satellite or a GLONASS satellite) or a vehicle or a radio or a robot or a data acquisition system or a signal generator or a sound synthesizer.

Additional embodiments are described in the following numbered paragraphs.

1. A method for synchronizing a master clock unit at a first location with a slave clock unit at a second location, different from the first location, the method comprising:

transmitting a first pulse onto an electrical cable through a first end of the electrical cable, wherein the electrical cable is sufficiently long to extend between the first location and the second location, wherein a leading edge of the first pulse has an exponential shape with exponential coefficient value $\alpha$;

measuring a round trip time-of-flight of the first pulse through the electrical cable, wherein the round trip time-of-flight is measured in terms of a number of clock cycles of the master clock unit;

dividing the round trip time-of-flight by two to obtain a one-way time-of-flight;

performing first operations using first circuitry situated at the first location, wherein the first operations include:

adding a current time value of the master clock unit to an adjustment value to obtain a resultant time value, wherein said adding the adjustment value accounts at least for the one-way time-of-flight through the electrical cable;

transmitting a sequence of pulses onto the electrical cable at the first end of the electrical cable, wherein each of the pulses of said sequence is either a zero pulse or a pulse of exponential kind, depending on a respective bit in a binary representation of the resultant time value, wherein each pulse of exponential kind in the sequence of pulses has a leading edge that is exponentially shaped with the exponential coefficient value $\alpha$;

performing second operations using second circuitry situated at the second location, wherein the second operations include:

receiving the sequence of pulses from a second end of the electrical cable;

converting the received sequence of pulses into a corresponding sequence of bits in order to recover the resultant time value;

loading the resultant time value into the slave clock unit in order to synchronize the slave clock unit with the master clock unit.

2. The method of paragraph 1, wherein said adding the adjustment value also accounts for a temporal length of the pulse sequence in terms of clock cycles of the master clock unit.

3. The method of paragraph 1, wherein the first circuitry is configured to transmit an action trigger time to the second circuitry, wherein the action trigger time is a future time value of the master clock at which the second circuitry is to perform an action (such as a data acquisition, signal generation, signal transmission, signal measurement, etc.), wherein said transmission of the action trigger time is performed after the resultant time value has been loaded into the slave clock unit.

4. The method of paragraph 1, wherein said loading of the resultant time value into the slave clock unit creates a synchronized time that is shared by the master clock unit and the slave clock unit, wherein the first circuitry and second circuitry are each configured to perform a respective action (such as data acquisition, signal generation, signal transmission, signal measurement, etc.) at a common value of the synchronized time.

5. A system for synchronizing a master clock unit at a first location with a slave clock unit at a second location, different from the first location, the system comprising:

exponential waveform generation circuitry configured to transmit a first pulse onto an electrical cable through a first end of the electrical cable, wherein the electrical cable is sufficiently long to extend between the first location and the second location, wherein a leading edge of the first pulse has an exponential shape with exponential coefficient value $\alpha$;

measurement circuitry configured to measure a round trip time-of-flight of the first pulse through the electrical cable, wherein the round trip time-of-flight is measured in terms of a number of clock cycles of the master clock unit;

division circuitry configured to divide the round trip time-of-flight by two to obtain a one-way time-of-flight;

first circuitry situated at the first location, and configured to perform first operations including:

adding a current time value of the master clock unit to an adjustment value to obtain a resultant time value, wherein said adding the adjustment value accounts at least for the one-way time-of-flight through the electrical cable;

transmitting a sequence of pulses onto the electrical cable through the first end of the electrical cable, wherein each of the pulses of said sequence is either a zero pulse or a pulse of exponential kind, depending on a respective bit in a binary representation of the resultant time value, wherein each pulse of exponential kind in the sequence of pulses has a leading edge that is exponentially shaped with the exponential coefficient value $\alpha$;

second circuitry situated at the second location, and configured to perform second operations including:

receiving the sequence of pulses from a second end of the electrical cable;

converting the received sequence of pulses into a corresponding sequence of bits in order to recover the resultant time value;

loading the resultant time value into the slave clock unit in order to synchronize the slave clock unit with the master clock unit.

In one set of alternative embodiments, the pulse sequence comprises positive-going and negative-going pulses of exponential kind. When generating the pulse sequence, a binary one value may be mapped to a positive-going pulse of exponential kind, and a binary zero value may be mapped to a negative-going pulse of exponential kind.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method for facilitating synchronization of a master clock unit at a first location with a slave clock unit at a second location, different from the first location, the method comprising:

performing operations using first circuitry situated at the first location, wherein the operations include:

transmitting a sequence of pulses onto an electrical cable at a first end of the electrical cable, wherein the electrical cable extends between the first location and the second location, wherein each of the pulses of said sequence is either a zero pulse or a pulse of exponential kind, depending on a respective bit in a binary representation of a given time value, wherein the given time value depends at least on: (a) a current time value of the master clock; and (b) a one-way time of flight through the electrical cable, wherein each pulse of exponential kind in the sequence of pulses has a leading edge that is exponentially shaped with the exponential coefficient value $\alpha$.

2. The method of claim 1, further comprising:

transmitting a first pulse onto the electrical cable at the first end of the electrical cable, wherein a leading edge of the first pulse has the exponential shape with exponential coefficient value $\alpha$;

measuring a round trip time-of-flight of the first pulse through the electrical cable, wherein the round trip time-of-flight is measured in terms of a number of clock cycles of the master clock unit;

dividing the round trip time-of-flight by two to obtain the one-way time-of-flight.

3. The method of claim 2, wherein said measuring the round trip time-of-flight of the first pulse includes averaging a plurality of time separation values corresponding respectively to a plurality of amplitude thresholds spanning a given amplitude range, wherein each of the time separation values is a time separation between (a) a time when a leading edge of a return pulse responsive to the transmitted first pulse crosses the respective amplitude threshold and (b) a time when the leading edge of the transmitted first pulse crosses the respective amplitude threshold, wherein the given amplitude range is a subrange of a full amplitude range of the leading edge of the return pulse, wherein the given amplitude range is an interval over which time separation value is relatively constant.

4. The method of claim 2, wherein a duration $t_P$ of the leading edge of the first pulse satisfies the condition that the product $\alpha t_P$ equals a constant r in the range [5.0,7.0], wherein the leading edge of the first pulse conforms to the expression $D_P*\exp(\alpha t)$, where t is time, where $D_P$ is determined based on the equation $D_P*\exp(r)=V_{PEAK}$, wherein $V_{PEAK}$ is an amplitude of a peak of the leading edge of the first pulse.

5. The method of claim 1, wherein the given time value is a sum of at least:

(a) the current time value of the master clock; and (b) a number of clock cycles of the master clock corresponding to the one-way time of flight through the electrical cable.

6. The method of claim 1, wherein the first circuitry includes a digital-to-analog conversion (DAC) circuit, wherein each pulse of exponential kind in said sequence of pulses is generated by applying a set of sample values to the DAC circuit.

7. The method of claim 1, wherein each pulse of exponential kind in said sequence of pulses is generated by an analog circuit including an analog integrator and an analog amplifier, wherein an output of the analog amplifier is coupled to an input of the analog integrator.

8. The method of claim 1, wherein each pulse of exponential kind in said sequence of pulses is generated by applying a linear ramp signal to an analog circuit element whose current-voltage characteristic is exponentially shaped.

9. The method of claim 1, wherein each pulse of exponential kind in said sequence of pulses is generated by:

generating a plurality of analog signals corresponding respectively to terms in a Taylor series approximation of an exponential function; and adding the plurality of analog signals using an analog addition circuit.

10. The method of claim 1, wherein the slave clock is used to control timing of a process at or near the second location.

11. The method of claim 10, wherein the process includes one or more of the following:

a measurement of one or more physical quantities;

an analog-to-digital conversion of a signal received by a receiver;

a purchase of an item from an online exchange or marketplace;

a transmission of a radio signal into space;

a transmission of an electrical signal onto an electrically conductive medium;

a transmission of an optical signal onto an optical fiber.

12. The method of claim 1, wherein the master clock unit is used to control timing of a first process at or near the first location, wherein the slave clock unit is used to control timing of a second process at or near the second location.

13. The method of claim 1, wherein the operations also include:

transmitting an action trigger time to second circuitry at the second location, wherein the action trigger time is a future time value of the master clock unit at which second circuitry at the second location is to perform an action, wherein the action trigger time is transmitted after the transmission of the sequence of pulses.

14. A method for facilitating synchronization of a master clock unit at a first location with a slave clock unit at a second location, different from the first location, the method comprising:

performing operations using circuitry situated at the second location, wherein the operations include:

receiving a sequence of pulses from an end of the electrical cable, wherein the electrical cable extends between the first location and the second location, wherein each of the pulses of said sequence is either a zero pulse or a pulse of exponential kind, wherein each pulse of exponential kind in the sequence of pulses has a leading edge that is exponentially shaped with the exponential coefficient value $\alpha$;

converting the received sequence of pulses into a corresponding sequence of bits in order to recover a first time value, wherein each of the pulses of said sequence of pulses is used to determine a corresponding one of the bits of said sequence of bits;

loading the first time value or a value derived from the first time value into the slave clock unit in order to synchronize the slave clock unit with the master clock unit.

15. The method of claim 14, wherein the first time value is a sum of at least:
(a) a time value of the master clock; and
(b) a number of clock cycles of the master clock corresponding to a one-way time of flight through the electrical cable.

16. The method of claim 15, wherein the sum also includes:
(c) a value that accounts for a temporal length of the pulse sequence in terms of clock cycles of the master clock unit.

17. The method of claim 14, wherein the operations also include:
receiving a signal from the end of the electrical cable, wherein the signal indicates an action trigger time, wherein the action trigger time is a future time value of the master clock unit at which said circuitry is to perform an action.

18. The method of claim 14, wherein said circuitry includes threshold detection circuitry, which is configured to perform said converting by determining, for each pulse of the pulse sequence, whether the pulse exceeds a threshold.

19. The method of claim 18, wherein the threshold is programmable.

20. The method of claim 14, wherein, after said loading of the first time value into the slave clock, the slave clock is used to control timing of a process at or near the second location.

21. The method of claim 20, wherein the process includes one or more of the following:
a measurement of one or more physical quantities;
an analog-to-digital conversion of a signal received by a receiver;
a purchase of an item from an online exchange or marketplace;
a transmission of a radio signal into space;
a transmission of an electrical signal onto an electrically conductive medium;
a transmission of an optical signal onto an optical fiber.

22. The method of claim 14, wherein said loading of the first time value into the slave clock establishes a synchronization of the slave clock unit to the master clock unit, wherein, after said loading of the first time value into the slave clock:
the master clock unit is used to control timing of a first process at or near the first location; and/or
the slave clock unit is used to control timing of a second process at or near the second location.

23. The method of claim 14, wherein an offset value is added to the first time value prior to loading the first time value into the slave clock unit, wherein the offset value accounts for a delay between:
a time when the sequence of pulses arrives at the end of the electrical cable; and
a time when said loading of the first time value into the slave clock unit is completed.

24. The method of claim 14, wherein the circuitry is included in a satellite or a vehicle or a radio or a robot or a data acquisition system or signal generator or a sound synthesizer.

25. A system for facilitating synchronization of a master clock unit at a first location with a slave clock unit at a second location, different from the first location, the system comprising:
first circuitry situated at the first location and configured to perform operations including:
transmitting a sequence of pulses onto an electrical cable at a first end of the electrical cable, wherein the electrical cable extends between the first location and the second location, wherein each of the pulses of said sequence is either a zero pulse or a pulse of exponential kind, depending on a respective bit in a binary representation of a given time value, wherein the given time value depends at least on: (a) a current time value of the master clock; and (b) a one-way time of flight through the electrical cable, wherein each pulse of exponential kind in the sequence of pulses has a leading edge that is exponentially shaped with the exponential coefficient value $\alpha$.

26. The system of claim 25, further comprising:
transmission circuitry configured to transmit a first pulse onto the electrical cable at the first end of the electrical cable, wherein a leading edge of the first pulse has the exponential shape with exponential coefficient value $\alpha$;
measurement circuitry configured to measure a round trip time-of-flight of the first pulse through the electrical cable, wherein the round trip time-of-flight is measured in terms of a number of clock cycles of the master clock unit;
division circuitry configured to divide the round trip time-of-flight by two to obtain the one-way time-of-flight.

27. The system of claim 25, wherein the given time value is a sum of at least:
(a) the current time value of the master clock; and
(b) a number of clock cycles of the master clock corresponding to the one-way time of flight through the electrical cable.

28. The system of claim 27, wherein the sum also includes:
(c) a value that accounts for a temporal length of the pulse sequence in terms of clock cycles of the master clock unit.

29. The system of claim 25, wherein the first circuitry includes a digital-to-analog conversion (DAC) circuit, wherein each pulse of exponential kind in said sequence of pulses is generated by applying a set of sample values to the DAC circuit.

30. The system of claim 25, wherein the slave clock is used to control timing of a process at or near the second location.

31. The system of claim 30, wherein the process includes one or more of the following:
a measurement of one or more physical quantities;
an analog-to-digital conversion of a signal received by a receiver;
a digital-to-analog conversion of a sequence of samples, to obtain an analog signal;
a purchase of an item from an online exchange or online marketplace;
a transmission of a radio signal into space;
a transmission of an electrical signal onto an electrically conductive medium;
a transmission of an optical signal onto an optical fiber;
a transmission of a laser signal into space.

32. The system of claim 25, wherein the master clock unit is used to control timing of a first process at or near the first location, wherein the slave clock unit is used to control timing of a second process at or near the second location.

33. The system of claim 25, wherein the operations also include:

transmitting an action trigger time to second circuitry at the second location, wherein the action trigger time is a future time value of the master clock unit at which second circuitry at the second location is to perform an action, wherein the first circuitry is configured to transmit the action trigger time after the transmission of the sequence of pulses.

34. A system for facilitating synchronization of a master clock unit at a first location with a slave clock unit at a second location, different from the first location, the system comprising:

circuitry situated at the second location and configured to perform operations including:

receiving a sequence of pulses from an end of the electrical cable, wherein the electrical cable extends between the first location and the second location, wherein each of the pulses of said sequence is either a zero pulse or a pulse of exponential kind, wherein each pulse of exponential kind in the sequence of pulses has a leading edge that is exponentially shaped with the exponential coefficient value $\alpha$;

converting the received sequence of pulses into a corresponding sequence of bits in order to recover a first time value, wherein each of the pulses of said sequence of pulses is used to determine a corresponding one of the bits of said sequence of bits;

loading the first time value or a value derived from the first time value into the slave clock unit in order to synchronize the slave clock unit with the master clock unit.

35. The system of claim 34, wherein the operations also include:

receiving a signal from the end of the electrical cable, wherein the signal indicates an action trigger time, wherein the action trigger time is a future time value of the master clock unit at which said circuitry is to perform an action.

36. The system of claim 34, wherein said circuitry includes threshold detection circuitry, which is configured to perform said converting by determining, for each pulse of the pulse sequence, whether the pulse exceeds a threshold.

37. The system of claim 34, wherein, after said loading of the first time value into the slave clock, the slave clock is used to control timing of a process at or near the second location.

38. The system of claim 37, wherein the process includes one or more of the following:

a measurement of one or more physical quantities;

an analog-to-digital conversion of a signal received by a receiver;

a digital-to-analog conversion of a sequence of samples, to obtain an analog signal;

a purchase of an item from an online exchange or online marketplace;

a transmission of a radio signal into space;

a transmission of an electrical signal onto an electrically conductive medium;

a transmission of an optical signal onto an optical fiber;

a transmission of a laser signal into space.

39. The system of claim 34, wherein said loading of the first time value into the slave clock unit establishes a synchronization of the slave clock to the slave clock, wherein, after said loading of the first time value into the slave clock unit:

the master clock unit is used to control timing of a first process at or near the first location; and/or the slave clock unit is used to control timing of a second process at or near the second location.

40. The system of claim 34, wherein the circuitry is included in a satellite or a vehicle or a radio or a robot or a data acquisition system or a signal generator or a sound synthesizer.

* * * * *